Figure 1:
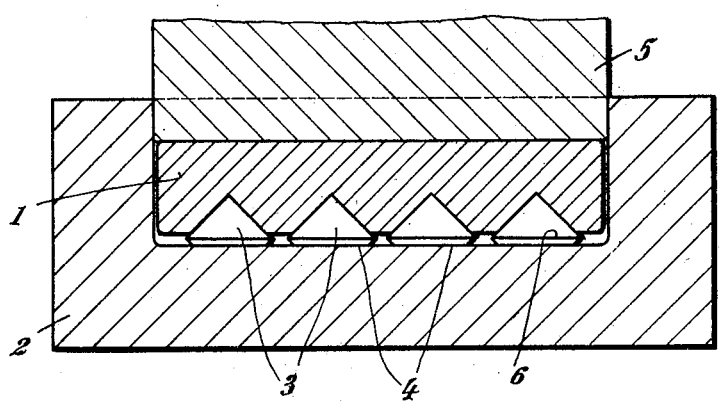

Oct. 10, 1950

D. SWAROVSKI 2,525,465

METHOD OF MASS PRODUCTION OF OBJECTS
FORMED OF MOLDABLE MATERIAL
Filed Aug. 22, 1947

INVENTOR:
DANIEL SWAROVSKI
BY K. A. Mayr
ATTORNEY

Patented Oct. 10, 1950

2,525,465

UNITED STATES PATENT OFFICE 2,525,465

METHOD OF MASS PRODUCTION OF OBJECTS FORMED OF MOLDABLE MATERIAL

Daniel Swarovski, Wattens, Tirol, Austria

Application August 22, 1947, Serial No. 770,202
In Germany February 25, 1939

Section 1, Public Law 690, August 8, 1946
Patent expires February 25, 1959

3 Claims. (Cl. 18—59)

The present invention relates to a method of mass production of articles composed of a holder body formed of moldable material having a plurality of small pieces or elements made of other material embedded therein with their faces coinciding substantially with the face portions of the articles. The object of the invention is to simplify the usual method of producing such articles. The pieces to be embedded, consist for instance of glass, metal, artificial stone and the like.

With the method according to the invention, no special holding devices are needed which, with conventional processes, remain in the moldable mass and are lost. According to the invention the pieces to be embedded are loosely inserted in cavities or recesses of a preformed holder body corresponding in form approximately to the final shape of the article. The body is then pressed in a mold to its final shape for tightly and permanently connecting the embedded pieces with the body. No special holding device for the small bodies is needed as they are held by the preformed holder body which remains part of the article to be produced. For carrying out the method according to the invention particularly materials come into consideration which are rendered plastic on heating and which may be hardened by an additional supply of heat.

The method according to the invention is particularly adapted for the manufacture of articles having a face composed substantially of the faces of a plurality of small bodies embedded in the face portion of a holder body, as for instance jewelries ingemmed with glass stones, metal decorations or other decorative bodies, light signals with individually embedded reflecting elements and so on.

If possible the cavities or recesses of the preformed holder body are preferably of such a form that the insertion of the small bodies into the recesses or cavities may be effected by spreading the small bodies on the recessed face of the preformed body, and then shaking and smoothing the pieces into the depressions. The holder body preformed in a cold or hot state is then placed together with the inserted bodies into one half of a mold, then the half mold containing the holder body with the inserted small bodies is turned upside down, whereupon the other portion of the mold is placed in position and pressure is exerted by which the preformed body assumes the final shape of the object to be produced.

In the accompanying drawing means are shown for carrying out the method according to the invention.

Figure 2:
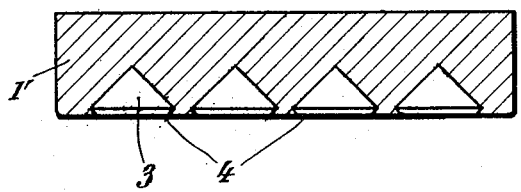

In the drawing:

Fig. 1 illustrates a section through a mold together with a preformed body and the small bodies inserted therein in the moment before the final forming of the article, and Fig. 2 is a section through the finished article.

The article to be produced has the form of a plate in the front side of which rows of decorative bodies or the like 3 are embedded whereby the plane faces 4 of the surfaces of the decorative bodies are flush with the front surface of the holder body 1'. As may be seen in Fig. 1 the preformed body 1 has substantially the form of the plate to be produced and is provided with recesses or cavities for the insertion of the small bodies 3 to be embedded. The section of body 1 parallel to its face is somewhat smaller and the body is higher than the final article and can easily be inserted into the lower portion 2 of the mold. The pieces 3 are arranged closely adjacent and have the shape of prisms or cones the bases of which, after insertion of the pieces into the recesses or cavities project somewhat from the front surface of the body 1. The edges of the base surfaces of the pieces 3 are ground to form facets 4 which are smaller than the section 6 of the small bodies parallel to their faces. The faces rest on the inside bottom of the mold and additional hollow spaces are formed in the mold corresponding to the removed edges. During final pressing of the body 1 by lowering the plunger 5 forming the upper portion of the mold, all hollow spaces of the form are filled, whereby the moldable mass overlaps the facets and extends around the portion of the pieces 3 protruding from the preformed holder body 1 and the bodies 3 are buried and anchored and securely held by the holder member 1' as may be seen in Fig. 2.

For inserting the small bodies 3 into the recesses of the preformed holder body 1, the latter may be placed in a position upside down to that shown in Fig. 1 and the small bodies strewn on its recessed surface and smoothed into the recesses. Thereupon the mold portion 2 is slipped over the holder body with the inserted small bodies and the whole assembly turned upside down to the position shown in Fig. 1. Then the top portion 5 of the mold is inserted and pressure is applied thereon. Turning upside down of mold portion 2 with the inserted holder body and small pieces may be omitted and mold portion 5 pushed in from below.

Alternatively, the small pieces 3 may be placed in the bottom of mold 2 in the position shown in Fig. 1 and the preformed holder body placed on top thereof. In certain cases it is to be preferred to form the major part of the holder body to its final shape in the first operation except its portion wherein the small pieces are inserted, whereupon in a second operation the portion in which the decorations are embedded is once more heated, finally deformed under pressure and hardened.

I claim:

1. The method of making articles comprising a holder body of plastic material having a face portion formed substantially by a surface portion of elements of a material relatively harder than the material of the holder body impressed in the holder body, said method comprising forming the holder body to a shape different from yet similar to its final shape and simultaneously forming recesses in its face conforming individually with a substantial art of said elements, placing the elements into the recesses, placing the holder body with the elements in a mold, making the material of substantially the entire holder body plastic, and molding, by pressure, the holder body to its final shape.

2. The method of making articles comprising a holder body of plastic material having a face portion formed substantially by a surface portion of elements of relatively hard non-plastic material impressed in the holder body, said method comprising the steps of forming the entire holder body to a shape different from yet similar to its final shape and simultaneously forming recesses in its face portion smaller than said elements, placing the elements into the recesses, making the material of the entire holder body plastic, and molding the body by pressure to its final shape and simultaneously pressing the elements into their final positions relative to the holder body.

3. The method of making articles comprising a holder body of plastic material having a face substantially formed by and being flush with the faces of elements of relatively hard material impressed in the holder body, said method comprising the steps of forming the holder body to a shape different from yet similar to its final shape and simultaneously forming recesses in its face portion smaller than said elements, placing the elements into the recesses, thereupon making the material of substantially the entire holder body plastic, and molding the body by pressure to its final shape and simultaneously pressing the elements into the holder body until their faces are flush with the face of the holder body.

DANIEL SWAROVSKI.

REFERENCES CITED

The following references are of record in the file of this patent:

UNITED STATES PATENTS

| Number | Name | Date |
|---|---|---|
| 665,989 | Bechtold | Jan. 15, 1901 |
| 714,447 | Brown | Nov. 25, 1902 |
| 2,158,044 | Haller | May 9, 1939 |

OTHER REFERENCES

Ser. No. 322,152 (A. P. C.), published Apr. 27, 1943.